Dec. 29, 1959  H. M. GEYER  2,918,903
HIGH TEMPERATURE HYDRAULIC ACTUATOR ASSEMBLY
Filed April 14, 1958
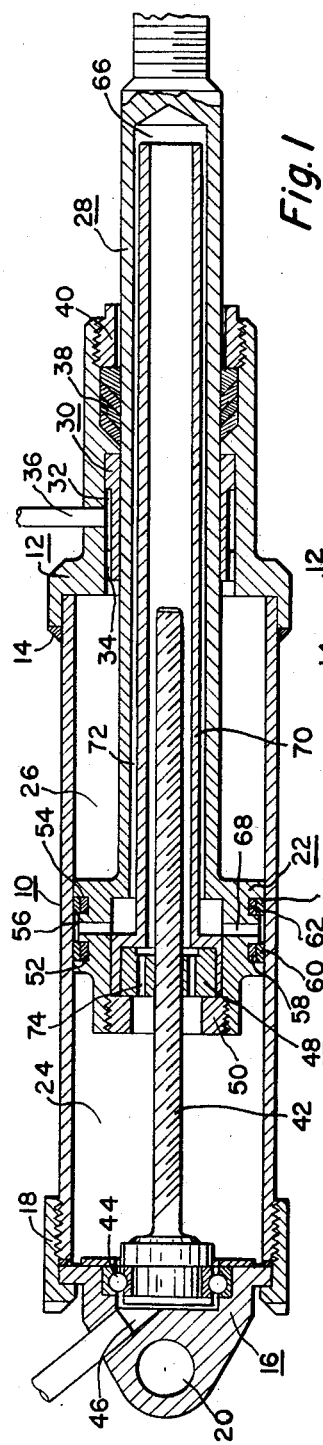
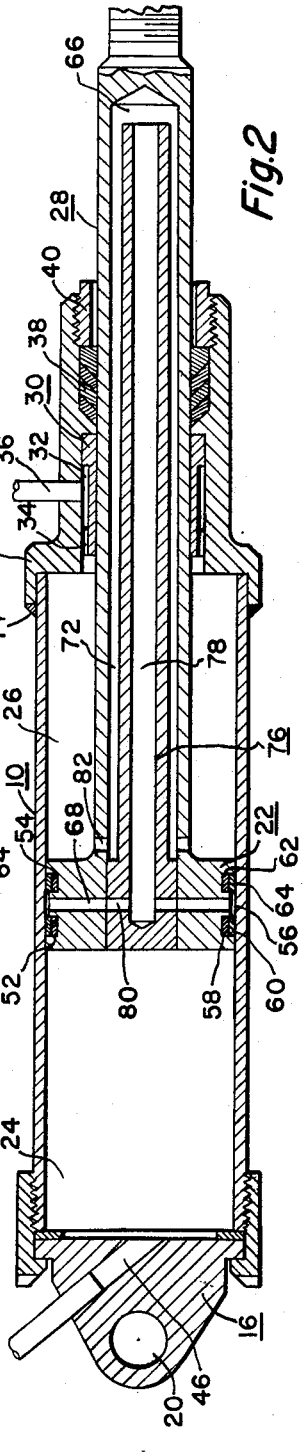
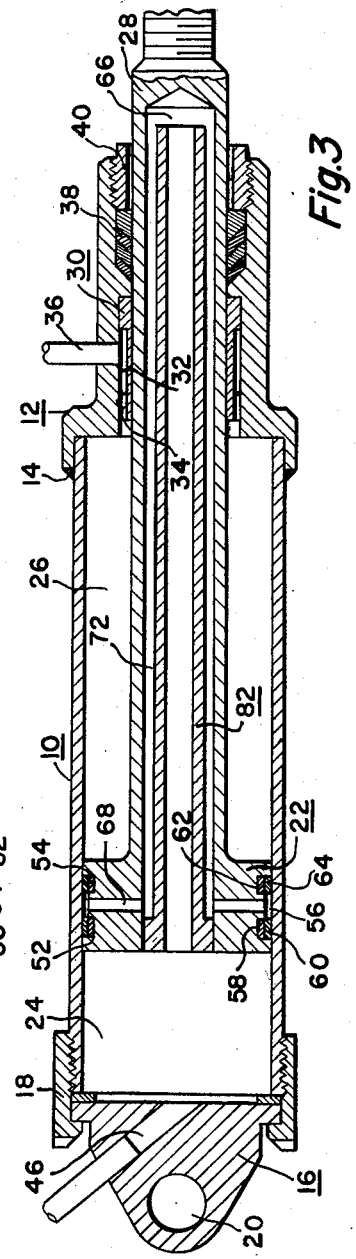
INVENTOR.
Howard M. Geyer.
BY
D. C. Staley
His Attorney.

United States Patent Office 2,918,903
Patented Dec. 29, 1959

2,918,903

HIGH TEMPERATURE HYDRAULIC ACTUATOR ASSEMBLY

Howard M. Geyer, Dayton, Ohio, assignor to General Motors Corporation, Detroit, Mich., a corporation of Delaware Application April 14, 1958, Serial No. 728,228

17 Claims. (Cl. 121—38)

This invention pertains to actuators, and particularly to hydraulic actuators designed for use in high ambient temperatures.

Heretofore, it has been proposed to incorporate pressure drop bushings in hydraulic actuators, the pressure drop bushings constituting self-cleaning orifice means for permitting a metered amount of hydraulic fluid to circulate between opposed actuator chambers due to a pressure differential thereacross, and through a hollow piston rod to cool the actuator parts subjected to temperatures in the range of 1000° F. The hydraulic fluid must be continuously circulated at temperatures in this range since it will congeal if allowed to remain static for any appreciable length of time. Actuator assemblies of this type are disclosed in my copending applications Serial No. 648,361 filed March 25, 1957, and Serial No. 681,033 filed October 29, 1957.

The present invention relates to improved actuator assemblies wherein the self-cleaning orifice means for permitting the circulation of cooling fluid are constituted by metallic piston ring means. Accordingly, among my objects are the provision of a hydraulic actuator assembly including means for circulating cooling fluid between opposed actuator chambers due to a pressure differential therebetween; the further provision of an actuator assembly including a piston having a pair of spaced sets of piston rings and a screw shaft connected to the piston including means for circulating fluid which flows past one set of piston rings; and the still further provision of an actuator assembly including a piston having a pair of spaced sets of piston rings including means for circulating fluid flowing past one set of piston rings throughout substantially the entire length of a hollow piston rod due to a pressure differential between opposed actuator chambers.

The aforementioned and other objects are accomplished in the present invention by forming a peripheral annular groove in the piston between the spaced sets of piston rings and connecting this annular groove with a hollow piston rod. Specifically, three embodiments of the actuator assembly including the novel self-cleaning orifice means of this invention are disclosed herein. In all of the embodiments the actuator includes a cylinder having disposed therein a reciprocable piston which divides the cylinder into an extend chamber and a retract chamber. The piston has an integral axially extending hollow rod which extends outside of the cylinder for connection to a movable load device, and the cylinder is suitably attached to a fixed support. Moreover, in all embodiments, the piston carries a flush tube disposed within and radially spaced from the inner wall of the hollow piston rod.

In the first embodiment, the piston also carries a nut which threadedly engages a screw shaft supported for rotation within the actuator cylinder. The piston is restrained against rotation by reason of its connection to the load device, and accordingly, piston reciprocation is dependent upon and effects rotation of the screw shaft. The screw shaft may be utilized for synchronizing a plurality of like actuators by interconnecting the screw shafts of adjacent actuators in the manner shown in my Patent #2,657,539. The annular groove between the spaced sets of piston rings is connected to the annular space between the flush tube and the hollow piston rod. The flush tube connects the closed outer end of the piston rod with the extend actuator chamber through a plurality of passages in the nut whereby one set of piston rings is subjected to the same pressure on opposite sides, and the other set of piston rings is subjected to the pressure differential existent between the extend and retract actuator chambers. Accordingly, a metered amount of fluid will flow past the second set of piston rings, which fluid is circulated throughout substantially the entire length of the hollow piston rod from one actuator chamber to the other actuator chamber.

In the second embodiment, the actuator piston carries a flush tube having a closed end, the closed end thereof being connected to the annular groove between the spaced sets of piston rings. In this embodiment the piston rod is formed with passage means interconnecting the retract chamber and the annular groove between the piston rod and the flush tube. Accordingly, one set of piston rings is subjected to the pressure differential existent between the opposed actuator chambers, while the other set of piston rings is subjected to the same pressure on opposite sides thereof. In this embodiment fluid flowing past the set of piston rings subjected to the pressure differential likewise flows throughout substantially the entire length of the hollow piston rod to effect cooling thereof.

In the third embodiment, the actuator piston includes a hollow flush tube of the same type as used in the first embodiment, and hence the annular groove between the flush tube and the hollow piston rod is connected to the piston groove between the two sets of piston rings. Accordingly, when the actuator chambers are subjected to a pressure differential, a metered amount of fluid will flow past the set of piston rings across which there is a pressure differential throughout substantially the entire length of the hollow piston rod from the one actuator chamber to the other actuator chamber.

Further objects and advantages of the present invention will be apparent from the following description, reference being had to the accompanying drawing, wherein preferred embodiments of the present invention are clearly shown, and wherein similar numerals indicate similar parts throughout the several views.

In the drawing:

Figure 1 is a longitudinal sectional view of an actuator constructed according to one embodiment of this invention.

Figure 2 is a longitudinal sectional view of an actuator constructed according to a second embodiment of this invention.

Figure 3 is a longitudinal sectional view of an actuator constructed according to a third embodiment of this invention.

With particular reference to Figure 1, an actuator is shown including a cylinder 10 having a rod end cap 12 attached thereto by a weld as indicated by numerals 14. The other end of the cylinder 10 is closed by a head cap 16 held in assembled relation with the cylinder by a nut 18. The head cap 16 includes a suitable fixture 20 by which it can be attached to a fixed support, not shown.

A reciprocable piston 22 is disposed within the cylinder 10, and divides the cylinder into an extend chamber 24 and a retract chamber 26. The piston 22 is formed with an integral hollow rod 28 which extends through the rod end cap 12 for connection to a movable load device, not shown. In the illustrated embodiments, the actuators are of the linear type and thus the load devices connected to the piston rods prevent rotation of the rods and pistons relative to their respective cylinders. A pressure drop bushing 30 is press fitted into the rod end cap 12, the piston rod 28 being slidably supported by the pressure drop bushing. The pressure drop bushing is formed with an external annular groove 32 that communicates with the retract chamber 26 through a plurality of circumferentially spaced axial passages 34. The groove 32 communicates with a retract port 36 formed on the rod end cap 12 through which fluid is supplied to and drained from the retract chamber 26. A plurality of metallic sealing rings 38, constituting a low pressure seal, prevent leakage of fluid from the low pressure side of the pressure drop bushing 30 around the periphery of the piston rod 28. The sealing rings 38 are held in position by a nut 40 which threadedly engages the rod end cap 12.

A screw shaft, or rotatable member, 42 is rotatably journalled by a ball bearing assembly 44 within the head cap 16. The head cap 16 is formed with an extend port 46 that communicates with the extend chamber 24 through the ball bearing assembly 44 for supplying and draining fluid to and from the extend chamber 24. The piston 22 carries a nut 48 which threadedly engages the screw shaft 42. The nut 48 is rigidly attached to the piston 22 by means of a threaded ring 50 so as to be constrained for movement therewith. Accordingly, reciprocation of the piston 22 and nut 48 effects rotation of the screw shaft 42. The screw shaft may be connected with like screw shafts of adjacent actuators so as to synchronize the movement of a plurality of actuators in accordance with aforementioned Patent 2,657,539.

The piston 22 is formed with a pair of axially spaced annular grooves 52 and 54 and a third annular groove 56 disposed between the grooves 52 and 54, the groove 56 having a depth appreciably less than the depth of the grooves 52 and 54. The groove 52 receives a pair of split cast iron piston rings 58 and 60 and the groove 54 receives a pair of split cast iron piston rings 62 and 64. The annular groove 56 communicates with a central bore 66 in the piston rod through a plurality of radially extending passages 68. The bore 66 of the piston rod is closed adjacent the outer end thereof as indicated in the drawing. A flush tube 70 is press fitted into the piston 22, the outer surface of the flush tube 70 being radially spaced from the inner surface of the bore 66 in the piston rod so as to form an annular groove or channel 72. The screw shaft 42 extends into the tube 70 as indicated in Figure 1. The nut 48 is formed with a plurality of circumferentially spaced holes 74 which connect the extend chamber 24 with the interior of the tube 70.

When the extend chamber 24 is subjected to hydraulic fluid under pressure and the retract chamber 26 is connected to drain, the fluid will act on the piston 22 and effect movement thereof to the right, as viewed in Figure 1. In addition, a metered amount of fluid will flow through the holes 74 in the nut, through the tube 70 to the closed outer end of the bore 66 in the piston rod, through the annular groove 72 and the passage 68 to the annular groove 56 in the piston 22. Accordingly, the pressure existent in the annular groove 56 will be the same as the pressure existent in the extend chamber 24 so that fluid will not flow past the piston ring 60. However, a pressure differential exists across the piston ring 64 since the retract chamber 26 is connected to drain and the groove 56 is subjected to the pressure of the extend chamber 24. Therefore, a metered amount of fluid will flow past the piston ring 64 into the retract chamber 26 through the passages 34 to the annular groove 32 in the pressure drop bushing 30 to drain through the port 36. This metered amount of circulating fluid will cool the rod 28 which is subjected to high ambient temperatures since the fluid must flow throughout substantially the entire length of the piston rod 28 before it can leak past the piston ring 64. Since the piston 22 reciprocates relative to the cylinder 10, the orifice means constituted by the piston ring 64 are self-cleaning.

When the retract chamber 26 is subjected to fluid under pressure and the extend chamber 24 is connected to drain, it is readily apparent that the annular groove 56 is subjected to the pressure existent in the extend chamber 24 through passages 68, the groove 72, the tube 70 and the passages 74 in the nut 48. Accordingly, a pressure differential exists across the piston ring 64, and the piston ring will permit a metered amount of fluid to flow from the retract chamber 26 past the piston ring 64 through the passages 68, the groove 72, the tube 70 and the passages 74 to the extend chamber 24 which is connected to drain through the port 46. Accordingly, whenever there is a pressure differential between the opposed actuator chambers, a metered amount of fluid will circulate throughout substantially the entire length of the hollow rod 28 to effect cooling thereof from the chamber having a higher pressure potential to the chamber having the lower pressure potential. In this manner, circulation of hydraulic fluid for actuator cooling is assured at all times to thereby prevent the congealing of hydraulic fluid within the actuator and prevent damage to the actuator parts due to overheating.

With reference to Figure 2, a second embodiment of an actuator assembly constructed according to this invention is shown. In the second embodiment, the piston 22 carries a flush tube 76 having a bore 78 which is closed at the inner end thereof. The flush tube 76 has a plurality of circumferentially spaced radial passages 80 connecting with the radial passages 68 in the piston 22. Moreover, the piston rod 28 has a plurality of circumferentially spaced radial passages 82 which connect the inner end of the annular groove 72 with the retract chamber 26. In the embodiment of Figure 2, the piston ring 60 constitutes the self-cleaning orifice means since whenever there is a pressure differential between the opposed actuator chambers 24 and 26, this pressure differential appears across the piston ring 60.

Operation of the actuator depicted in Figure 2 is as follows. When the extend chamber 24 is subjected to fluid under pressure, and the retract chamber 26 is connected to drain, the left hand side of the piston ring 60 is subjected to the pressure in the chamber 24. The annular groove 56 in the piston 22 is subjected to the drain pressure of chamber 26 through passages 82, the groove 72, the passage 78 in the tube 76, the passages 80 in the tube 76 and the passages 68 in the piston. Accordingly, a metered amount of fluid will flow from the extend chamber 24 past the piston ring 60 to the groove 56. The fluid from the groove 56 will flow through passages 68 and 80 through the tube 76 to the closed outer end of the piston rod. This fluid will then flow through the groove 72 through passages 82 to the retract chamber 26 and thence to drain through passages 34, the groove 32 and the port 36. Accordingly, a metered amount of fluid will be circulated from the extend chamber 24 throughout substantially the entire length of the hollow piston rod 28 to the retract chamber.

Conversely, when the retract chamber 26 is connected to pressure and the extend chamber 24 is connected to drain, the annular groove 56 in the piston 22 will be subjected to the pressure existent in the retract chamber 26. However, the left hand side of the piston ring 60 will be exposed to the drain pressure in chamber 24. Therefore, a metered amount of fluid will flow from the retract chamber 26 through passages 82 to groove 72. The fluid will flow to the closed outer end of the bore 66 in the piston rod and thence through the bore 78 of the tube 76 and through passages 80 and 68 to the groove 56. This fluid will then flow past the piston ring 60 into the chamber 24 and thence to drain through port 46.

With reference to Figure 3, a third embodiment of an actuator including the piston ring orifice means will be described. In this embodiment, the actuator piston 22 has press fitted therein a hollow flush tube 82 which connects the extend chamber 24 with the closed outer end of the bore 66 in the piston rod 28. The flush tube 82 is spaced from the inner wall of the hollow rod 28 to form the annular groove 72, and the annular groove 72 connects with the passages 68 in the piston 22 which connect with the piston groove 56. In the embodiment of Figure 3, the pressure differential existent between opposed actuator chambers 24 and 26 exists across the piston ring 64, since the annular groove 56 is connected at all times through passages 68, the groove 72 and the tube 82 with the extend chamber 24. Accordingly, when the extend chamber 24 is subjected to pressure and the retract chamber 26 is connected to drain, a metered amount of fluid will flow from the extend chamber through the tube 82, the groove 72, the passages 68 and the groove 56 past the piston ring 64 to the retract chamber 26. Conversely, when the retract chamber 26 is connected to pressure and the extend chamber 24 is connected to drain, a metered amount of fluid will flow from the retract chamber past the piston ring 64 to the annular groove 56, and thence through passages 68, the groove 72 and the tube 82 to the extend chamber 24.

From the foregoing it is apparent that the present invention provides an exceedingly simple arrangement for circulating cooling fluid throughout substantially the entire length of a hollow piston rod due to a pressure differential between opposed actuator chambers. Moreover, the use of piston rings as the self-cleaning orifice means greatly simplifies the actuator construction and readily lends itself to actuators of different types.

While the embodiments of the invention as herein disclosed constitute preferred forms, it is to be understood that other forms might be adopted.

What is claimed is as follows:

1. A fluid pressure operated actuator assembly including, a cylinder, a reciprocable piston disposed in said cylinder having a hollow rod extending therefrom with a closed outer end, said piston dividing said cylinder into opposed chambers and having piston ring means subjected to the pressure differential existent between said opposed chambers, passage means in said piston communicating with one end of said hollow rod for circulating fluid flowing past said piston ring means throughout substantially the entire length of said hollow piston rod, and passage means connecting the other end of said hollow piston rod with one of said chambers.

2. A fluid pressure operated actuator assembly including, a cylinder, a reciprocable piston disposed in said cylinder having a hollow rod extending therefrom with a closed outer end, said piston dividing said cylinder into opposed chambers and having piston ring means subjected to the pressure differential existent between said opposed chambers, a member rotatably journalled in said cylinder and operatively connected to said piston so as to rotate upon piston reciprocation, passage means in said piston communicating with one end of said hollow piston rod for circulating fluid flowing past said piston ring means throughout substantially the entire length of said hollow piston rod, and passage means connecting the other end of said hollow piston rod with one of said chambers.

3. A fluid pressure operated actuator assembly including, a cylinder, a reciprocable piston disposed in said cylinder having a hollow rod extending therefrom with a closed outer end, said piston dividing said cylinder into opposed chambers and having piston ring means subjected to the pressure differential existent between said opposed chambers, a tube carried by said piston, said tube extending into said hollow piston rod and terminating short of the closed end thereof, said tube being spaced from the inner wall of said hollow piston rod to form a channel therebetween, passage means in said piston communicating with one end of said hollow rod for circulating fluid flowing past said piston ring throughout substantially the entire length of said piston rod in the channel between said tube and said hollow rod, and passage means connecting the other end of said hollow rod with one of said chambers.

4. A fluid pressure operated actuator assembly including, a cylinder, a reciprocable piston disposed in said cylinder having a hollow rod extending therefrom with a closed outer end, said piston dividing said cylinder into opposed chambers and having a pair of spaced piston rings with an annular groove therebetween, and passage means connecting the annular groove in said piston with one of said chambers throughout substantially the entire length of said hollow piston rod whereby one of said piston rings is subjected to the pressure differential existent between said opposed chambers and constitutes a metering orifice permitting circulation of fluid between said chambers throughout substantially the entire length of said hollow piston rod.

5. A fluid pressure operated actuator assembly including, a cylinder, a reciprocable piston disposed in said cylinder having a hollow rod extending therefrom with a closed outer end, said piston dividing said cylinder into opposed chambers, said piston having a pair of piston rings engaging said cylinder and spaced apart by an annular groove, and passage means connecting said annular groove with one of said chambers whereby one of said piston rings will be subjected to the pressure differential existent between said opposed chambers so as to permit circulation of fluid between said chambers through said passage means.

6. A fluid pressure operated actuator assembly including, a cylinder, a reciprocable piston disposed in said cylinder having a hollow rod extending therefrom with a closed outer end, said piston dividing said cylinder into opposed chambers, said piston having a pair of piston rings spaced apart by an annular groove, passage means connecting said annnular groove with one end of said hollow piston rod, and passage means connecting the other end of said hollow piston rod with one of said chambers whereby one of said piston rings will be subjected to the pressure differential existent between said opposed chambers and permit a metered amount of fluid to flow between said chambers throughout substantially the entire length of said hollow piston rod.

7. A fluid pressure operated actuator assembly including, a cylinder, a reciprocable piston disposed in said cylinder having a hollow rod extending therefrom with a closed outer end, said piston dividing said cylinder into opposed chambers and having a pair of piston rings spaced apart by an annular groove, said piston having at least one radial passage connecting said annular groove with one end of said hollow piston rod, and passage means connecting the other end of said hollow piston rod with one of said chambers whereby one of said piston rings will be subjected to the pressure differential existent between said opposed chambers and permit a metered flow of fluid between said chambers throughout substantially the entire length of said hollow piston rod.

8. A fluid pressure operated actuator assembly including, a cylinder, a reciprocable piston disposed in said cylinder having a hollow rod extending therefrom with a closed outer end, a member rotatably supported in said cylinder and operatively connected to said piston so as to rotate upon piston reciprocation, said piston dividing said cylinder into opposed chambers and having a pair of spaced piston rings with an annular groove therebetween, passage means connecting said annular groove with one end of said hollow piston rod, and passage means connecting the other end of said hollow piston rod with one of said chambers whereby one of said piston rings will be subjected to the pressure differential existent between said opposed chambers and permit a metered flow of fluid between said chambers throughout substantially the entire length of said hollow piston rod.

9. A fluid pressure operated actuator including, a cylinder, a reciprocable piston disposed in said cylinder having a hollow rod extending therefrom with a closed outer end, a member rotatably supported in said cylinder and operatively connected to said piston so as to rotate upon piston reciprocation, said piston dividing said cylinder into opposed chambers and having a pair of spaced piston rings and an annular groove therebetween, a tube carried by said piston and disposed within said hollow piston rod, said tube terminating short of the closed outer end of said piston rod and being radially spaced from the inner wall thereof so as to form a channel therebetween, passage means connecting the annular groove in said piston with the channel between said hollow rod and said tube, and passage means connecting the other end of said tube with one of said chambers whereby one of said piston rings is subjected to the pressure differential existent between said opposed chambers and permits a metered flow of fluid between said chambers throughout substantially the entire length of said hollow piston rod.

10. The actuator assembly set forth in claim 9 wherein said rotatable member comprises a screw shaft, and wherein the operative connection between said rotatable member and said piston comprises a nut rigidly attached to said piston and threadedly engaging said screw shaft.

11. The actuator assembly set forth in claim 10 wherein said nut has at least one hole therethrough constituting the passage means connecting the other end of said tube with one actuator chamber.

12. The actuator assembly set forth in claim 9 wherein the passage means connecting the annular groove in the piston with the channel between said tube and said piston rod comprises a plurality of radial passages in said piston, and wherein said tube is coaxially disposed within said rod.

13. A fluid pressure operated actuator assembly including, a cylinder, a reciprocable piston disposed in said cylinder having a hollow rod extending therefrom with a closed outer end, said piston dividing said cylinder into opposed chambers and having a pair of piston rings separated by an annular groove, a tube carried by said piston and extending into said hollow piston rod, the outer end of said tube terminating short of the closed end of said piston rod and being radially spaced from the inner wall of said piston rod to form a channel therebetween, passage means interconnecting the annular groove in said piston with the inner end of said tube, and passage means in said rod interconnecting the channel between said tube and said rod with one of said chambers whereby one of said piston rings is subjected to the pressure differential existent between said opposed chambers and permits a metered flow of fluid between said chambers throughout substantially the entire length of said hollow piston rod.

14. The actuator assembly set forth in claim 13 wherein the inner end of said tube is closed, and wherein the passage means interconnecting the annular groove in said piston and the inner end of said tube comprise aligned radial passages in said tube and said piston.

15. A fluid pressure operated actuator assembly including, a cylinder, a reciprocable piston disposed in said cylinder having a hollow rod extending therefrom with a closed outer end, said piston dividing said cylinder into opposed chambers and having a pair of piston rings separated by an annular groove, a tube carried by said piston and extending into said hollow piston rod, one end of said tube terminating short of the closed outer end of said piston rod and being spaced from the inner wall thereof so as to form a channel therebetween, passage means connecting the annular groove of said piston with the channel between said tube and said rod, the other end of said tube being connected with one of said chambers whereby one of said piston rings is subjected to the pressure differential existent between said chambers and permits a metered flow of fluid between said chambers throughout substantially the entire length of said hollow piston rod.

16. A fluid pressure operated actuator assembly including, a cylinder, a reciprocable piston disposed in said cylinder and dividing said cylinder into opposed chambers, said piston having piston ring means subjected to the pressure differential existent between said opposed chambers, and passage means in said piston communicating with one of said chambers for circulating fluid flow past said piston ring means between said opposed chambers.

17. A fluid pressure operated actuator assembly including, a cylinder, a reciprocable piston disposed in said cylinder and dividing said cylinder into opposed chambers, said piston having a pair of piston rings engaging said cylinder and spaced apart by an annular groove, and passage means connecting said annular groove with one of said chambers whereby one of said piston rings will be subjected to the pressure differential existent between said opposed chambers so as to permit a metered amount of fluid to flow between said opposed chambers through said passage means.

References Cited in the file of this patent
UNITED STATES PATENTS

| | | |
|---|---|---|
| 277,305 | Maltby | May 8, 1883 |
| 674,234 | Christie | May 14, 1901 |
| 2,270,742 | Schneider | Jan. 20, 1942 |
| 2,698,006 | Wechmann | Dec. 28, 1954 |